US012052255B2

(12) United States Patent
Sarkar et al.

(10) Patent No.: US 12,052,255 B2
(45) Date of Patent: Jul. 30, 2024

(54) COLLECTIVE USER ACCOUNTS

(71) Applicant: Meta Platforms, Inc., Menlo Park, CA (US)

(72) Inventors: Shilpa Sarkar, La Jolla, CA (US); Ryan Keenan Olson, Aspen, CO (US); Josselyn Tsai, Montauk, NY (US); Christopher Wendel, Brooklyn, NY (US); Peter Michael Cottle, Boulder, CO (US); Ian McIntyre Silber, San Francisco, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 321 days.

(21) Appl. No.: 17/529,923

(22) Filed: Nov. 18, 2021

(65) Prior Publication Data
US 2023/0156010 A1    May 18, 2023

(51) Int. Cl.
*H04L 67/306* (2022.01)
*G06Q 50/00* (2012.01)
*H04L 9/40* (2022.01)

(52) U.S. Cl.
CPC .......... *H04L 63/102* (2013.01); *G06Q 50/01* (2013.01); *H04L 67/306* (2013.01)

(58) Field of Classification Search
CPC ..... H04L 63/102; H04L 67/306; G06Q 50/01; G06Q 10/101
USPC ........................................................ 715/751
See application file for complete search history.

(56) References Cited

U.S. PATENT DOCUMENTS

| | | | |
|---|---|---|---|
| 10,984,183 B1 | 4/2021 | Clediere | |
| 2010/0205179 A1 | 8/2010 | Carson et al. | |
| 2016/0012739 A1 | 1/2016 | Jafari | |
| 2016/0173467 A1 | 6/2016 | Pasupuleti | |
| 2018/0032619 A1 | 2/2018 | Choi et al. | |
| 2018/0107746 A1 | 4/2018 | Jackson et al. | |
| 2019/0065591 A1 | 2/2019 | Sanio et al. | |
| 2019/0311439 A1* | 10/2019 | Quintana | ................ H04L 67/10 |
| 2023/0155853 A1 | 5/2023 | Olson | |

OTHER PUBLICATIONS

CN104639426A, Method and device for adding group members, published May 20, 2015, pp. 1-9. (Year: 2015).*
CN104639426B, Group member adding method and device, published Jun. 8, 2018, pp. 1-9. (Year: 2018).*
International Search Report and Written Opinion for International Application No. PCT/US2022/050060, dated Feb. 21, 2023, 10 pages.
International Search Report and Written Opinion for International Application No. PCT/US2022/049616, dated Feb. 7, 2023, 9 pages.
Office Action for U.S. Appl. No. 17/455,462, dated May 12, 2022, Olson, "Collaborative Posts", 17 pages.

* cited by examiner

*Primary Examiner* — Shahid K Khan
*Assistant Examiner* — Ahamed I Nazar
(74) *Attorney, Agent, or Firm* — McDermott Will & Emery LLP

(57) ABSTRACT

Techniques are described for a social networking system to provide collective accounts that allow for multiple holders, editors, and/or managers. In some cases, the social networking system may be configured to distribute content associated with the collective accounts based on metrics and relationships associated with accounts of the contributors to the collective account as well as the collective account itself.

20 Claims, 10 Drawing Sheets

COLLECTIVE USER ACCOUNTS

BACKGROUND

Social networking systems provide users with functionality to share content with other users. Most conventional social networking systems provide sharing in a one-to-one or one-to-many relationship via a user's account or page. However, there are times when multiple users work together on a project or participate together in an event. In that case, the multiple users may wish to post about the project or event. Current systems require each user to create their own individual post about the project or event to share with their connections on a social networking system.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
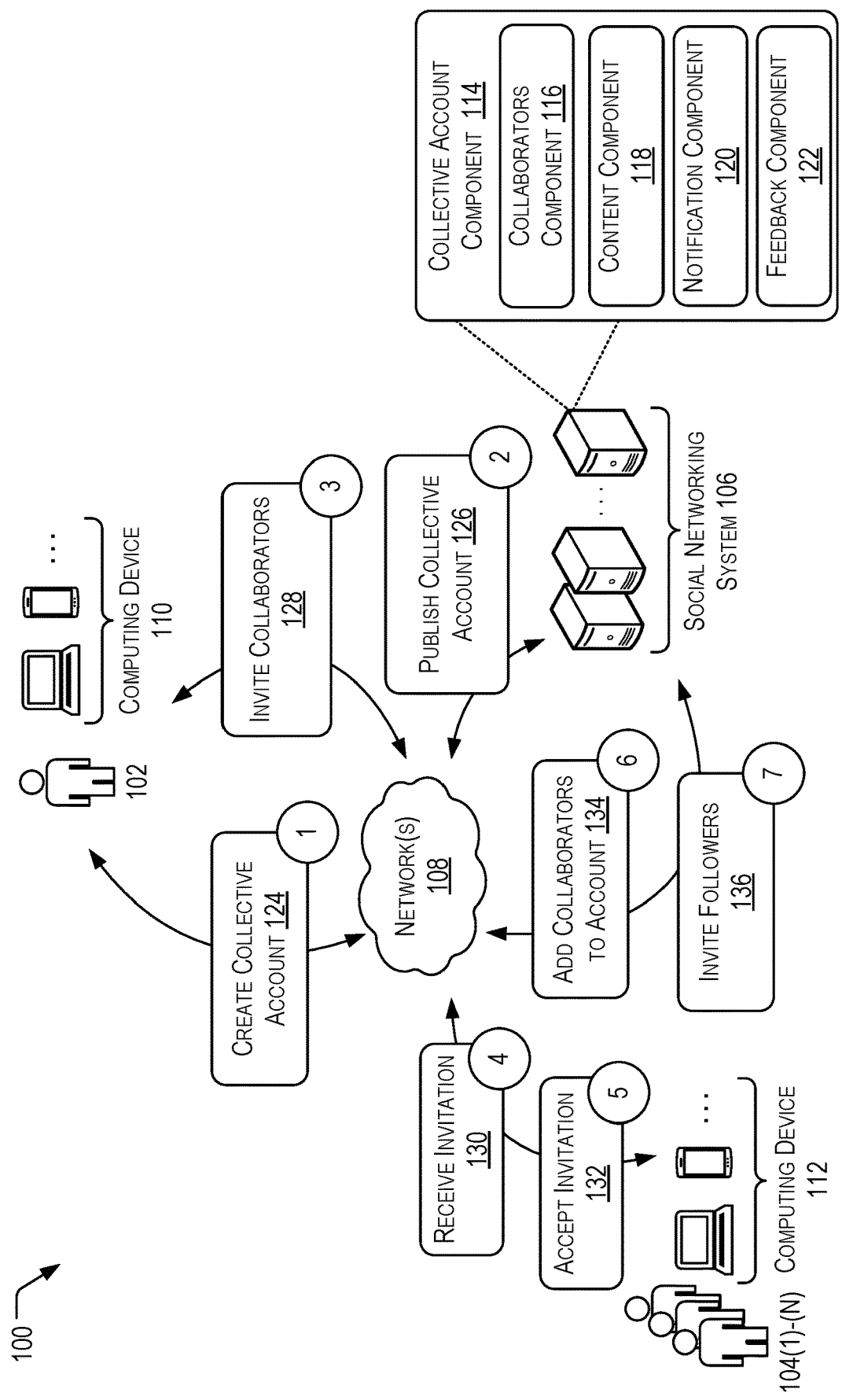
FIG. 1 is a view of an example system usable to assist with sharing collective content via a collective account, according to some implementations.

Social networking systems and websites are often used to promote events, projects, and the like via the sharing of content related to the events and/or projects. However, many of the conventional systems are directed to assisting social network users in promoting and providing information or content related to events or products in the form of text, images, video, and the like on an individual basis. For example, in conventional systems, content is posted, managed, shared, and/or stored with respect to a single user and a single user's account. Similarly, comments and other feedback associated with a content item or individual post is associated with and/or directed to the attention of the individual account holder.

The social networking system, discussed herein, is configured to allow users to create, share, and interact with content as a group or set of users via collective or collective accounts. In some cases, the collective account may have multiple account holders or users that are associated therewith. In some cases, a single user or original user may create a collective account and invite co-collaborators to post, share, and/or otherwise edit content associated with the collective account. With respect to the content created and shared via the collective account, the content may be stored in association with the collective account and distributed to a union of the set of users that are associated with individual users of the multiple co-collaborators. For instance, a post associated with the collective account may be distributed to each of the users "following" or otherwise associated with each of the individual co-collaborators as well as the users "following" or associated with the collective account.

As an illustrative example, a collective account may have a first, second, and third co-collaborator. When content is posted to the collective account, the content may be distributed to or a notification related with the content may be provided to a set of users that includes the followers of the first co-collaborator, the followers of the second co-collaborator, the followers of the third co-collaborator, and the direct followers of the collective account. The set of users may be filtered to remove any duplicate users (e.g., a user associated with two or more of the first co-collaborator, the second co-collaborator, the third co-collaborator or the collective account). In this manner, the content does not need to be separately posted to each of the individual accounts of the first co-collaborator, the second co-collaborator, and the third co-collaborator, thereby reducing the overhead, total content and storage requirements, computer resource consumption, and network resource consumption associated with posting the collective content.

Similarly, the users receiving the distribution and/or notification of the content only receive the content and/or the notification a single time. For example, in conventional systems if a user was associated with both the accounts of the first co-collaborator and the second co-collaborator, the user would have received the content twice (once when the first co-collaborator posted the content and once when the second co-collaborator posted the content). In the social networking system discussed herein, the user only receives the content and/or notification once. In this manner, again, the total amount of content, system resource consumption, and network resource computation is reduced by reducing duplication of content and duplication of notifications.

In some examples, the collective account may be public and available to the users associated with the individual collaborators' accounts, as discussed above. In some alternative examples, the collective account may be private (e.g., only open to the co-collaborators). In the private accounts, the co-collaborators are able to share and collaborate on content with each other, without sharing to other users. In this manner, the collective account provides the co-collaborators with the ability to work jointly on content as a private group of more than two users via the social networking system.

FIG. 1 is a view of an example system 100 usable to assist with sharing collective or collaborative content via a collective account, according to some implementations. In some examples, the system 100 may include a user 102 that may be an original account creator as well as other users 104(1)-104(N) (collectively "users 104") being invited as a co-collaborator on the collective account created by the user 102. The users 102 and 104 may interact with a social networking system 106 via a network 108 using computing devices, generally indicated by 110 and 112, respectively. In some cases, the user 102 may be more than one host user, but is referred to herein as a single user for clarity.

In the illustrated example, the social networking system 106 may include a collective account component 114. The collective account component 114 may include a number of sub-components or modules, such as collaborators component 116, content component 118, notification component 120, and/or feedback component 122. The collaborators component 116 may provide the user 102 with functionality to invite or add collaborators (e.g., the users 104) to the collective account. The content component 118 may be configured to provide functionality to create, edit, and host content to the user 102 and/or the users 104 with respect to the collective account. The notification component 120 may be configured to send content, alerts and/or notifications to other users (not shown) in response to the users 102 or 104 creating and/or posting content via the content component 118. In some cases, the notification component 120 may also be configured to determine a set or subset of users (not shown) to receive content, alerts and/or notifications. The feedback component 122 may be configured to determine one or more of the users 102 and 104 to which to notify, provide, and/or present feedback, comments, and the like related to the collective or collective content.

With respect to FIG. 1, the user 102 may be inviting the users 104 to act as collaborators or joint account holders for a collective account. For instance, in the illustrated example, the user 102 may, at operation 124 (indicated by "1"), create a new collective account. For instance, the user 102 may create an account in a manner of an individual user creating a personal account but select a collective or collective account option allowing multiple users to be account holders, contributors, and otherwise managers of the newly created collective account. For instance, the user 102 may specify identifying content (e.g., account name, address, and the like), background content (e.g., account story, purpose, goals, and the like), demographic or contact content (e.g., personal information of the user 102), initial content (e.g., original posts and the like), and the like.

In the illustrated example, at operation 126, (indicated by "2"), the social networking system 106 may create and/or publish the collective account. For example, if the account is a public account the social networking system 106 may publish a page or space associated with the collective account as well as any original content generated and/or recorded by the user 102.

Next, at operation 128 (indicated by "3"), the user 102 may invite the users 104 to act as collaborators with respect to the collective account. For example, the user 102 may select the users 104 by typing or entering the user's name, selecting the user 104 from a list or other tagged content, and the like. In this example, operation 128 is separated from operation 124 but it should be understood that in some cases, the invitation of the user 104 as collaborators may be incorporated into the collective account creation process.

At operation 130 (indicated by "4"), the users 104 may receive the invitation from the user 102. For example, the users 104 may receive a notification or alert as to the creation and/or invitation with the option to accept. At operation 132 (indicated by "5"), the users 104 may accept the invitation to be added as a collaborator with respect to the collective account.

In this example, at operation 134 (indicated by "6"), the social networking system 106 may add the users 104 that accepted the invitation as collaborators to the collective account. Once added, the users 104 may be able to post content, edit content, and the like with regards to the collective account. The user 104 may also be listed as owners or collaborators with respect to the collective account and/or content associated therewith. The social networking system may also, at operation 136 (indicated by "6"), invite followers associated with each individual user 104 to follow the collective account. For example, the followers of the users 104 may receive a notification informing the followers that the user 104 has joined the collective account and ask the followers if they would also like to follow the collective account.

In the illustrated example, each of the computing devices 110 and 112 may include one or more processors and memory storing computer executable instructions to implement the functionality discussed herein attributable to the various computing devices. In some examples, the computing devices 110 and 112 may include desktop computers, laptop computers, tablet computers, mobile devices (e.g., smart phones or other cellular or mobile phones, mobile gaming devices, portable media devices, etc.), or other suitable computing devices. The computing devices 110 and 112 may execute one or more client applications, such as a web browser (e.g., Microsoft Windows Internet Explorer, Mozilla Firefox, Apple Safari, Google Chrome, Opera, etc.) or a native or special-purpose client application (e.g., social media applications, messaging applications, email applications, games, etc.), to access and view content over the network 108.

The network 108 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which the computing devices 110 and 112 may access the social networking system 106 and/or communicate with one another.

The social networking system 106 may include one or more servers or other computing devices, any or all of which may include one or more processors and memory storing computer executable instructions to implement the functionality discussed herein attributable to the social networking system or digital platform. The social networking system 106 may enable its users 102 and 104 (such as persons or organizations) to interact with the social networking system 106 and with each other via the computing devices 110 and 112. The social networking system 106 may, with input from a user, create and store in the social networking system 106 a user account associated with the user. The user account may include demographic information, communication-channel information, and information on personal interests of the user. The social networking system 106 may also, with input from a user, create and store a record of relationships of the user with other users of the social networking system 106, as well as provide services (e.g., posts, comments, photo-sharing, messaging, tagging, mentioning of other users or entities, games, etc.) to facilitate social interaction between or among the users.

In some examples, the social networking system 106 may provide privacy features to the users 102 and 104 while interacting with the social networking system 106. In particular examples, one or more objects (e.g., content or other types of objects) of the system 106 may be associated with one or more privacy settings. The one or more objects may be stored on or otherwise associated with any suitable computing system or application, such as, for example, the social networking system 106, a client system, a third-party system, a social networking application, a messaging application, a photo-sharing application, or any other suitable computing system or application. Although the examples discussed herein are in the context of an online social network, these privacy settings may be applied to any other suitable computing system. Privacy settings (or "access settings") for an object or item of content may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example, and not by way of limitation, a user of the online social network may specify privacy settings for a user-profile page that identify a set of users that may access work-experience information on the user-profile page, thus excluding other users from accessing that information.

In particular examples, privacy settings for an object may specify a "blocked list" and/or a "restricted list" of users or other entities that should not be allowed to access certain information associated with the object. In particular examples, the blocked list may include third-party entities. The blocked list or restricted list may specify one or more users or entities for which an object is not visible. As an example, and not by way of limitation, a user may specify a set of users who may not access photo albums associated with the user, thus excluding those users from accessing the photo albums (while also possibly allowing certain users not within the specified set of users to access the photo albums). In particular examples, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example, and not by way of limitation, a particular concept node corresponding to a particular photo may have a privacy setting specifying that the photo may be accessed only by users tagged in the photo and friends of the users tagged in the photo. In particular examples, privacy settings may allow users to opt in to or opt out of having their content, information, or actions stored/logged by the social-networking system or shared with other systems (e.g., a third-party system). Although this disclosure describes using particular privacy settings in a particular manner, this disclosure contemplates using any suitable privacy settings in any suitable manner.

In particular examples, privacy settings may be based on one or more nodes or edges of a social graph. A privacy setting may be specified for one or more edges or edge-types of the social graph, or with respect to one or more nodes or node-types of the social graph. The privacy settings applied to a particular edge connecting two nodes may control whether the relationship between the two entities corresponding to the nodes is visible to other users of the online social network. Similarly, the privacy settings applied to a particular node may control whether the user or concept corresponding to the node is visible to other users of the online social network. As an example, and not by way of limitation, a user, such as a user 102 and 104, may share an object to the social networking system 106. The object may be associated with a concept node connected to a user node of the user 102 and/or 104 by an edge. The user 102 and/or 104 may specify privacy settings that apply to a particular edge connecting to the concept node of the object or may specify privacy settings that apply to all edges connecting to the concept node. In some examples, the user 102 and/or 104 may share a set of objects of a particular object-type (e.g., a set of images). The user 102 and/or 104 may specify privacy settings with respect to all objects associated with the user 102 and/or 104 of that particular object-type as having a particular privacy setting (e.g., specifying that all images posted by the user 102 and/or 104 are visible only to friends of the user and/or users tagged in the images).

In particular examples, the social networking system 106 may present a "privacy wizard" (e.g., within a webpage, a module, one or more dialog boxes, or any other suitable interface) to the user 102 and/or 104 to assist the user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular examples, the social networking system 106 may offer a "dashboard" functionality to the user 102 and/or 104 that may display, to the user 102 and/or 104, current privacy settings of the user 102 and/or 104. The dashboard functionality may be displayed to the user 102 and/or 104 at any appropriate time (e.g., following an input from the user 102 and/or 104 summoning the dashboard functionality, following the occurrence of a particular event or trigger action). The dashboard functionality may allow the user 102 and/or 104 to modify one or more of the user's current privacy settings at any time, in any suitable manner (e.g., redirecting the user 102 and/or 104 to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular examples, one or more servers of the social networking system 106 may be authorization/privacy servers for enforcing privacy settings. In response to a request from the user 102 and/or 104 (or other entity) for a particular object stored in a data store, the social networking system 106 may send a request to the data store for the object. The request may identify the user 102 and/or 104 associated with the request and the object may be sent only to the user 102 and/or 104 (or a client system of the user) if the authorization server determines that the user 102 is authorized to access the object based on the privacy settings associated with the object. If the requesting user is not authorized to access the object, the authorization server may prevent the requested object from being retrieved from the data store or may prevent the requested object from being sent to the user. In the search-query context, an object may be provided as a search result only if the querying user is authorized to access the object, e.g., if the privacy settings for the object allow it to be surfaced to, discovered by, or otherwise visible to the querying user. In particular examples, an object may represent content that is visible to a user through a newsfeed of the user. As an example, and not by way of limitation, one or more objects may be visible to a user's "Trending" page. In particular examples, an object may correspond to a particular user. The object may be content associated with the particular user, or may be the particular user's account or information stored on the social networking system 106, or other computing systems. As an example, and not by way of limitation, the user 102 and/or 104 may view one or more other users 102 and/or 104 of an online social network through a "People You May Know" function of the online social network, or by viewing a list of friends of the user 102. As an example, and not by way of limitation, the user 102 and/or 104 may specify that they do not wish to see objects associated with a particular other user (e.g., the user 102 and/or 104) in their newsfeed or friends list. If the privacy settings for the object do not allow it to be surfaced to, discovered by, or visible to the user 102 and/or 104, the object may be excluded from the search results. Although this disclosure describes enforcing privacy settings in a particular manner, this disclosure contemplates enforcing privacy settings in any suitable manner.

In particular examples, different objects of the same type associated with a user may have different privacy settings. Different types of objects associated with a user may also have different types of privacy settings. As an example, and not by way of limitation, the user 102 and/or 104 may specify that the user's status updates are public, but any images shared by the user are visible only to the user's friends on the online social network. In some examples, the user 102 and/or 104 may specify different privacy settings for different types of entities, such as individual users, friends-of-friends, followers, user groups, or corporate entities. In some examples, the user 102 and/or 104 may specify a group of users that may view videos posted by the user 102 and/or 104, while keeping the videos from being visible to the user's employer. In particular examples, different privacy settings may be provided for different user groups or user demographics. As an example, and not by way of limitation, the user 102 and/or 104 may specify that other users who attend the same university as the user 102 and/or 104 may view the user's pictures, but that other users who are family members of the user 102 and/or 104 may not view those same pictures.

In particular examples, the social networking system 106 may provide one or more default privacy settings for each object of a particular object-type. A privacy setting for an object that is set to a default may be changed by a user associated with that object. As an example, and not by way of limitation, all images posted by the user 102 and/or 104 may have a default privacy setting of being visible only to friends of the first user and, for a particular image, the user 102 and/or 104 may change the privacy setting for the image to be visible to friends and friends-of-friends.

In particular examples, privacy settings may allow the user 102 and/or 104 to specify (e.g., by opting out, by not opting in) whether the social networking system 106 may receive, collect, log, or store particular objects or information associated with the user 102 and/or 104 for any purpose. In particular examples, privacy settings may allow the user 102 and/or 104 to specify whether particular applications or processes may access, store, or use particular objects or information associated with the user. The privacy settings may allow the user 102 and/or 104 to opt in or opt out of having objects or information accessed, stored, or used by specific applications or processes. The social networking system 106 may access such information in order to provide a particular function or service to the user 102 and/or 104, without the social networking system 106 having access to that information for any other purposes. Before accessing, storing, or using such objects or information, the social networking system 106 may prompt the user 102 and/or 104 to provide privacy settings specifying which applications or processes, if any, may access, store, or use the object or information prior to allowing any such action. As an example, and not by way of limitation, the user 102 and/or 104 may transmit a message to the user 102 and/or 104 via an application related to the online social network (e.g., a messaging app), and may specify privacy settings that such messages should not be stored by the social networking system 106.

In particular examples, the user 102 and/or 104 may specify whether particular types of objects or information associated with the user 102 and/or 104 may be accessed, stored, or used by the social networking system 106. As an example, and not by way of limitation, the user 102 and/or 104 may specify that images sent by the user 102 and/or 104 through the social networking system 106 may not be stored by the social networking system 106. In some examples, the user 102 and/or 104 may specify that messages sent from the user 102 and/or 104 to another user may not be stored by the social networking system 106. In some cases, the user 102 and/or 104 may specify that all objects sent via a particular application may be saved by the social networking system 106.

In particular examples, privacy settings may allow the user 102 and/or 104 to specify whether particular objects or information associated with the user 102 and/or 104 may be accessed from particular client systems or third-party systems. The privacy settings may allow the user 102 and/or 104 to opt in or opt out of having objects or information accessed from a particular device (e.g., the phone book on a user's smart phone), from a particular application (e.g., a messaging app), or from a particular system (e.g., an email server). The social networking system 106 may provide default privacy settings with respect to each device, system, or application, and/or the user 102 and/or 104 may be prompted to specify a particular privacy setting for each context. As an example, and not by way of limitation, the user 102 and/or 104 may utilize a location-services feature of the social networking system 106 to provide recommendations for restaurants or other places in proximity to the user 102 and/or 104. The default privacy settings of the user 102 and/or 104 may specify that the social networking system 106 may use location information provided from the computing device 110 and/or 112 of the user 102 and/or 104 to provide the location-based services, but that the social networking system 106 may not store the location information of the user 102 and/or 104 or provide it to any third-party systems. The user 102 and/or 104 may then update the privacy settings to allow location information to be used by a third-party image-sharing application in order to geo-tag photos.

In particular examples, privacy settings may allow a user to engage in the ephemeral sharing of objects on the online social network. Ephemeral sharing refers to the sharing of objects (e.g., posts, photos) or information for a finite period of time. Access or denial of access to the objects or information may be specified by time or date. As an example, and not by way of limitation, a user may specify that a particular image uploaded by the user is visible to the user's friends for the next week, after which time the image may no longer be accessible to other users. In some examples, a company may post content related to a product release ahead of the official launch and specify that the content may not be visible to other users until after the product launch.

In particular examples, for particular objects or information having privacy settings specifying that they are ephemeral, the social networking system 106 may be restricted in its access, storage, or use of the objects or information. The social networking system 106 may temporarily access, store, or use these particular objects or information in order to facilitate particular actions of a user associated with the objects or information, and may subsequently delete the objects or information, as specified by the respective privacy settings. As an example, and not by way of limitation, the user 102 may transmit a message to the user 104, and the social networking system 106 may temporarily store the message in a data store until the user 104 has viewed or downloaded the message, at which point the social networking system 106 may delete the message from the data store. In some examples, continuing with the prior example, the message may be stored for a specified period of time (e.g., 2 weeks), after which point the social networking system 106 may delete the message from the data store.

In particular examples, changes to privacy settings may take effect retroactively, affecting the visibility of objects and content shared prior to the change. As an example, and not by way of limitation, the user 102 may share a first image and specify that the first image is to be public to all other users. At a later time, the user 102 and/or 104 may specify that any images shared by the user should be made visible only to a first user group. The social networking system 106 may determine that this privacy setting also applies to the first image and make the first image visible only to the first user group. In particular examples, the change in privacy settings may take effect only going forward. Continuing the example above, if the user 102 and/or 104 changes privacy settings and then shares a second image, the second image may be visible only to the first user group, but the first image may remain visible to all users. In particular examples, in response to a user action to change a privacy setting, the social networking system 106 may further prompt the user to indicate whether the user wants to apply the changes to the privacy setting retroactively. In particular examples, a user change to privacy settings may be a one-off change specific to one object. In particular examples, a user's change to privacy may be a global change for all objects associated with the user.

In particular examples, the social networking system 106 may determine that user 102 and/or 104 may want to change one or more privacy settings in response to a trigger action associated with the user 102 and/or 104. The trigger action may be any suitable action on the online social network. As an example, and not by way of limitation, a trigger action may be a change in the relationship between a first and second user of the online social network (e.g., "un-friending" a user, changing the relationship status between the users, etc.). In particular examples, upon determining that a trigger action has occurred, the social networking system 106 may prompt the user 102 and/or 104 to change the privacy settings regarding the visibility of objects associated with the user 102 and/or 104. The prompt may redirect the user 102 and/or 104 to a workflow process for editing privacy settings with respect to one or more entities associated with the trigger action. The privacy settings associated with the user 102 and/or 104 may be changed only in response to an explicit input from the user 102 and/or 104 and may not be changed without the approval of the user 102 and/or 104. As an example, and not by way of limitation, the workflow process may include providing the user 102 with the current privacy settings with respect to the user 104 or to a group of users (e.g., un-tagging the user 102 or the user 104 from particular objects, changing the visibility of particular objects with respect to the user 104 or a group of users), and receiving an indication from the user 102 to change the privacy settings based on any of the methods described herein, or to keep the existing privacy settings.

In particular examples, a user may need to provide verification of a privacy setting before allowing the user to perform particular actions on the online social network, or to provide verification before changing a particular privacy setting. When performing particular actions or changing a particular privacy setting, a prompt may be presented to the user to remind the user of his or her current privacy settings and to ask the user to verify the privacy settings with respect to the particular action. Furthermore, a user may need to provide confirmation, double-confirmation, authentication, or other suitable types of verification before proceeding with the particular action, and the action may not be complete until such verification is provided. As an example, and not by way of limitation, a user's default privacy settings may indicate that a person's relationship status is visible to all users (i.e., "public"). However, if the user changes his or her relationship status, the social networking system 106 may determine that such action may be sensitive and may prompt the user to confirm that his or her relationship status should remain public before proceeding. In some examples, a user's privacy settings may specify that the user's posts are visible only to friends of the user. However, if the user changes the privacy setting for his or her posts to being public, the social networking system 106 may prompt the user with a reminder of the user's current privacy settings of posts being visible only to friends, and a warning that this change will make all of the user's past posts visible to the public. The user may then be required to provide a second verification, input authentication credentials, or provide other types of verification before proceeding with the change in privacy settings. In particular examples, a user may need to provide verification of a privacy setting on a periodic basis. A prompt or reminder may be periodically sent to the user based either on time elapsed or a number of user actions. As an example, and not by way of limitation, the social networking system 106 may send a reminder to the user to confirm his or her privacy settings every six months or after every ten photo posts. In particular examples, privacy settings may also allow users to control access to the objects or information on a per-request basis. As an example, and not by way of limitation, the social networking system 106 may notify the user whenever a third-party system attempts to access information associated with the user and require the user to provide verification that access should be allowed before proceeding.

Figure 2:
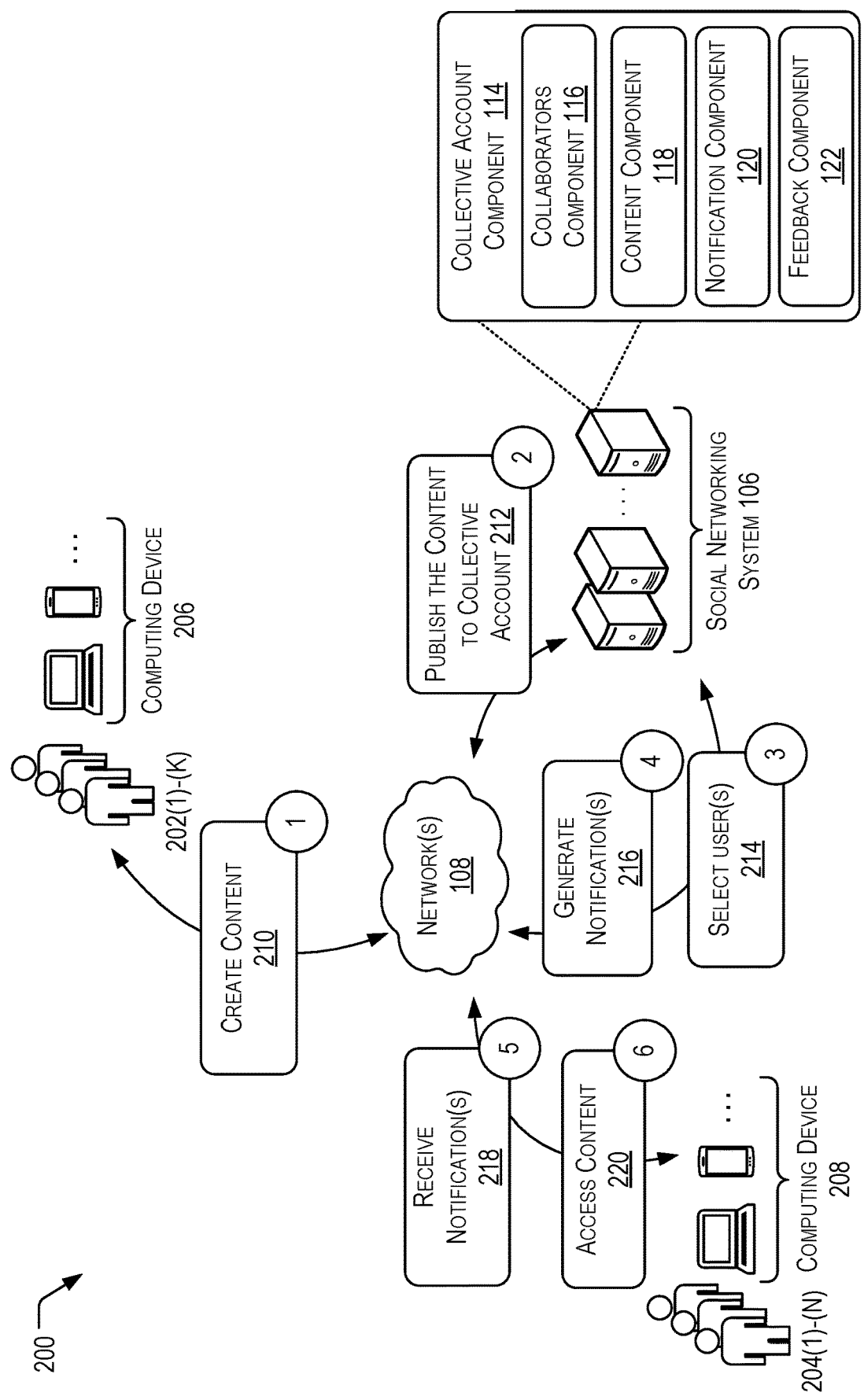
FIG. 2 is a view of another example system usable to assist with sharing collective content via a collective account, according to some implementations.

FIG. 2 is a view of another example system 200 usable to assist with sharing collective content via a collective account, according to some implementations. In some examples, the system 200 may include a set of collaborators 202(1)-(K) (collectively "users 202") as well as other users 204(1)-204(N) (collectively "users 204") consuming content associated with the collective account. In some cases, the users 202 are a set of users authorized to create, add, edit, remove and otherwise modify content to the collective account, such as the users 102 and 104 of FIG. 1. As discussed above, the users 202 and 204 may interact with the social networking system 106 via the network 108 using computing devices, generally indicated by 206 and 208, respectively.

As discussed above with respect to FIG. 1, the social networking system 106 may include the collective account component 114. The collective account component 114 may include a number of sub-components or modules, such as the collaborators component 116, the content component 118, the notification component 120, and/or the feedback component 122.

With respect to FIG. 2, one or more of the users 202 may create content (e.g., collective content) associated with, posted to, and/or hosted by the collective account. For instance, in the illustrated example, the one or more users 202 may, at operation 210 (indicated by "1"), create a new content for the collective account. For instance, the users 202 may create content via the content component 118 of the collective account component. In some case, the content may be generated in a manner of an individual user creating personal content but allow for multiple editors (e.g., the users 202) and/or attribution to multiple users (e.g., a set of the users 202).

Once the content is created, at operations 212 (indicated by "2"), the social networking system 106 may publish the content to the collective account. For example, the content may be published or made available to the other users 204 of the social networking system 106 at a specified or known location (such as a specific page associated with the collective account of the users 202).

At operations 214 (indicated by "3"), the social networking system 106 may select a subset of users of the social networking system 106 (such as the users 204) to send a notification or otherwise alert as to the newly published content. In some cases, the subset of users 204 may be selected based on the followers or users indicating they are interested in content published by any of the users 202 as well as users that are following or have indicated an interest in content published by the collective account. In this manner, the users 204 may include a union of the followers of the users 202 and followers of the collective account, such that no users receive the notification related to the newly created content more than once. In some examples, the users 204 may be selected using other criterion in addition to or in lieu of the union of collaborators, such as a followers of a subset of the users 202, a content topic or subject, areas of interest of the users 204, historical consumption of the users 204, other data known about the users 204, and the like.

At operation 216 (indicated by "4"), the social networking system may send a notification related of the content to the selected users 204 and, at operation 218 (indicated by "5"), the users 204 may receive the notification. In some cases, the notification may be a message, a posting of the content or the notification to a particular location associated with the user 204 (such as a feed), and the like. In some cases, the notification may be a summary or highlight of the content, such as one or more selected images or short video associated with the content, short text based description, or other insight into the subject or topic of the content. In some cases, the content of the notification may be selected by the users 202 when creating the collective content, such as a selected featured image or portion of a video. In some cases, the notification may include a link to access or otherwise consume the content via the social networking system 106.

At operation 220 (indicated by "6"), one or more of the users 204 may access the content via the notification or by accessing the specified location of the collective content on the social networking system 106.

Figure 3:
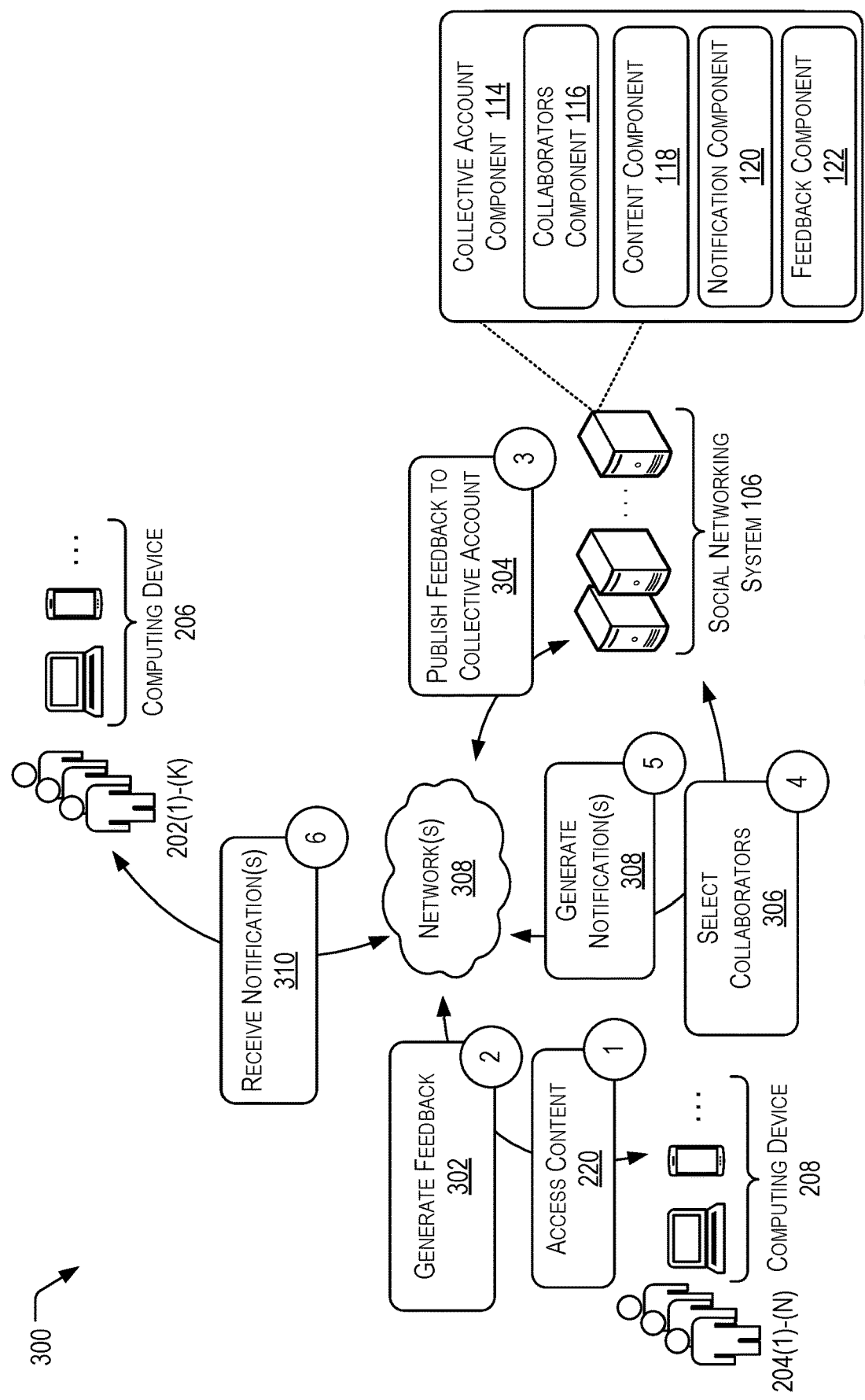
FIG. 3 is a view of yet another example system usable to assist with sharing collective content via a collective account, according to some implementations.

FIG. 3 is a view of yet another example system 300 usable to assist with sharing collective content via a collective account, according to some implementations. In this example, the users 204 may have accessed the collective content created with respect to the discussion of FIG. 2 and provided comments or other feedback to the collaborators 202 via the social networking system 106. In this example, the collaborators 202 may desire to provide a reply or other context associated with the feedback, however, due to the number of collaborators 202, the social networking system 106 may select one of the collaborators 202 to respond, thereby reducing any duplication on the social networking system 116.

In this example, the social networking system 106 may again include the collective account component 114, and the collective account component 114 may include the collaborators component 116, the content component 118, the notification component 120, and/or the feedback component 122.

With respect to FIG. 3, at operation 220 (indicated by "1"), one or more of the users 204 may access the collective content associated with the collective account of the users 202. The users 202 may then, at operation 302 (indicated by "2"), generate feedback, such as comments, likes, dislikes, shares, or other feedback related to the collective content posted to the collective account.

In response to receiving the feedback, the social networking system, at operation 304 (indicated by "3"), may publish the feedback to the collective account. For example, the feedback may be published as a comment or other addition to the collective content, added to one or more metrics associated with the collective content (e.g., a number of likes or number of dislikes), and the like.

At operation 306 (indicated by "4"), the social networking system may select one or more of the collaborators (e.g., the users 202) to receive a notification related to the feedback and, at operation 308 (indicated by "5"), the social networking system may generate and send the notifications to one or more of users 202. For example, the set of users receiving the notification may be selected from the users 202 based on content of the feedback, the type of feedback, the users 202 that contributed to the collective content, and the like. For example, if the content of the feedback includes a tag or reference to an individual collaborator 202, the social networking system 114 may a select the referenced collaborator 202 to receive and respond to the feedback.

The users 202 selected by the social networking system 106 may, at operation 310 (indicated by "6"), receive the notifications. In this manner, the users 202 may monitor feedback related to the collective content and the reactions of the users 204. the feedback may help the users 202 gauge new content to create, edits and/or updates to the content, and/or the like.

Figure 4:
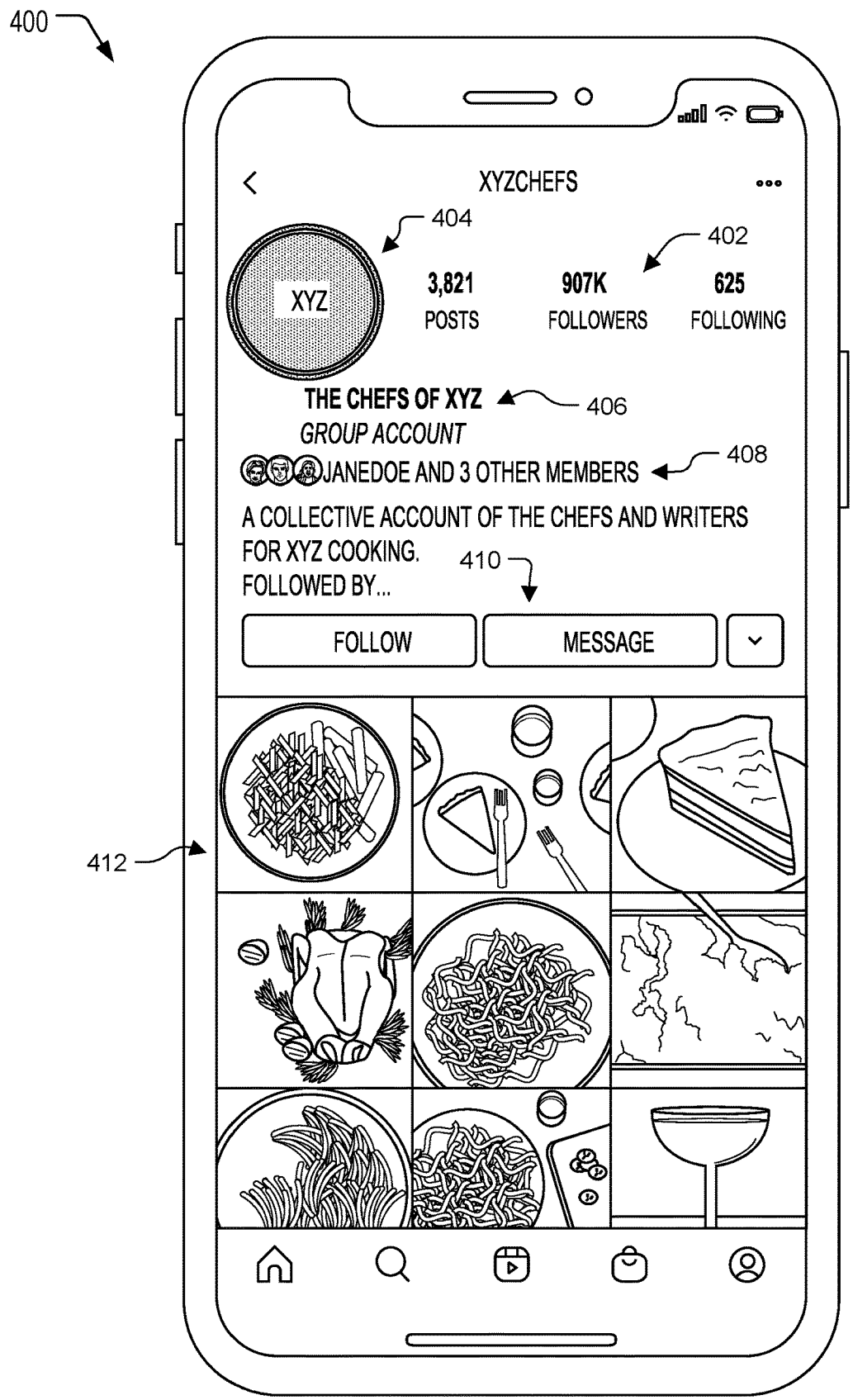
FIG. 4 is a view of an example home interface associated with a collective account according to some implementations.

FIG. 4 is a view of an example interface 400 associated with a collective account according to some implementations. In the current example, the interface 400 may include a metrics section 402 associated with the collective account, an icon section 404 associated with the collective account, a name or title section 406 associated with the collective account, a collaborators or contributors section 408 associated with the collective account, an interactive icon section 410 associated with the collective account, and a content section 412 associated with the collective account.

In the illustrated example, the metrics section 402 may include various metrics associated with the collective account and/or content associated with the collective account. For instance, as shown, the metrics may include a number of posts, a number of followers, a number of users the collective account is following, and the like. The icon section 404 may include a graphic associated with the collective account, selected for instance by the original collaborator (e.g., user 104 of FIG. 1). The name or title section 406 may include the name of the collective account and/or a short description of the subject related to or purpose of the collective account.

In the current example, the contributors section 408 includes three icons associated with three of the collaborators as well as a message that an additional three collaborates are associated with the collective account. In some cases, a viewing user may be able to see a full list of the collaborators by selecting or otherwise interacting with the collaborators section. It should also be understood that while three icons are shown in this example, the interface 400 may be configured to display any number of icons as well as names or other identifiers of the contributors. It should also be understood that the number of contributors may vary such that the "+3 contributors" may display any number of additional contributors. Further, as discussed herein, the owner or managing users of the collective account are referred to as collaborators but it should be understood that the owner users may be referred to via other nomenclature, such as contributors, account holders, account users, and the like.

The interactive icon section 410 may include a number of selectable options for the viewing user, such as "follow," or "message". In other examples, the interactive icon section 410 may include other selectable or interactive options. The content section 412 may include various collective content items that may be viewed or consumed by user of the social networking system.

Figure 5:
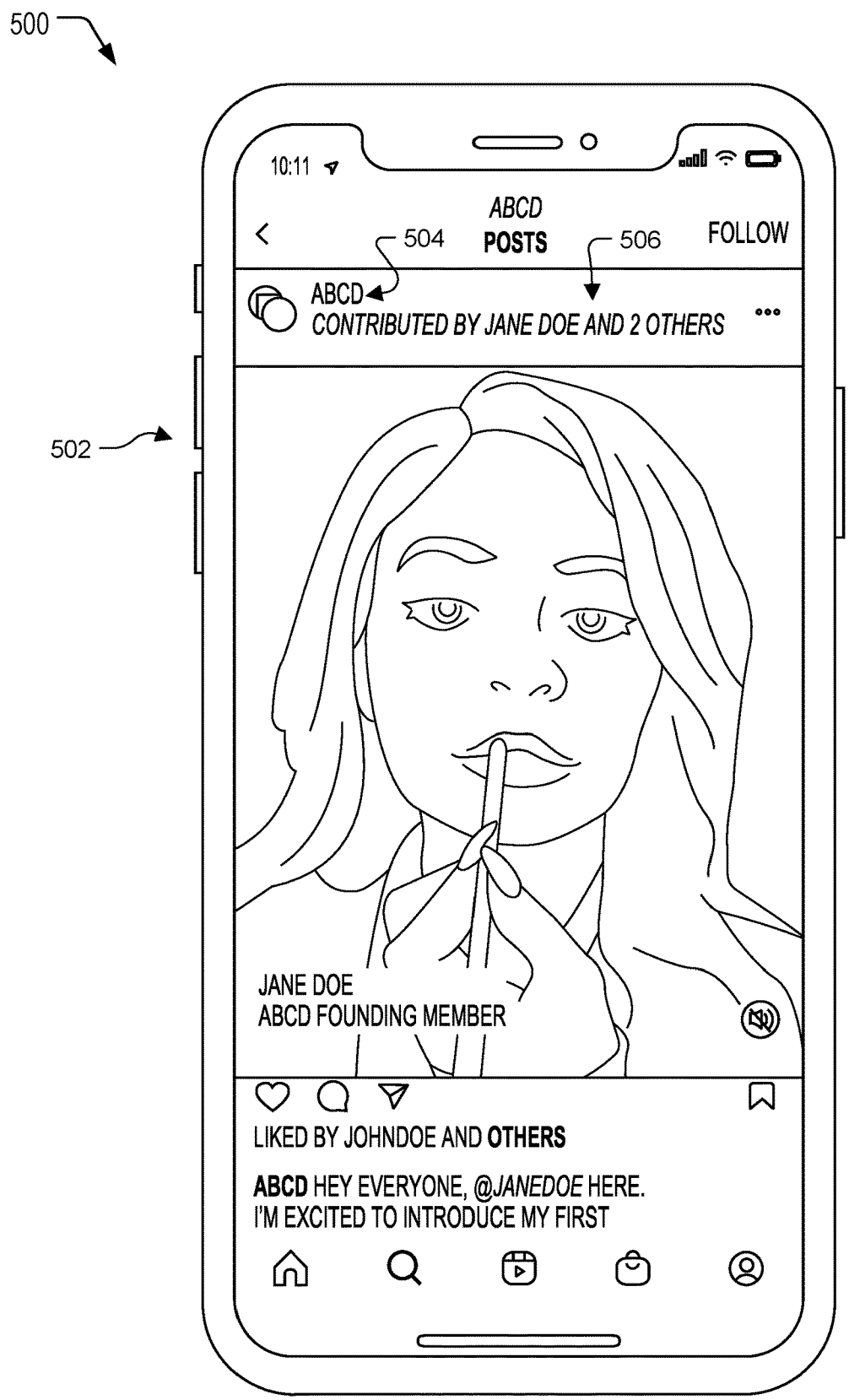
FIG. 5 a view of an example interface for viewing collective content associated with a collective account according to some implementations.

FIG. 5 a view of an example interface 500 for viewing collective content 502 associated with a collective account according to some implementations. In this example, the name or title 504 of the collective account may be displayed together with the contributing collaborator(s) (e.g., the one or more collaborators that generated the content 502), generally indicated by 506. In some cases, similar to the interface 400 of FIG. 4, if more than a predetermined number of collaborators contribute to the content, an indicator may be displayed to inform the viewing user that there are additional collaborators contributing to the content 502.

Figure 6:
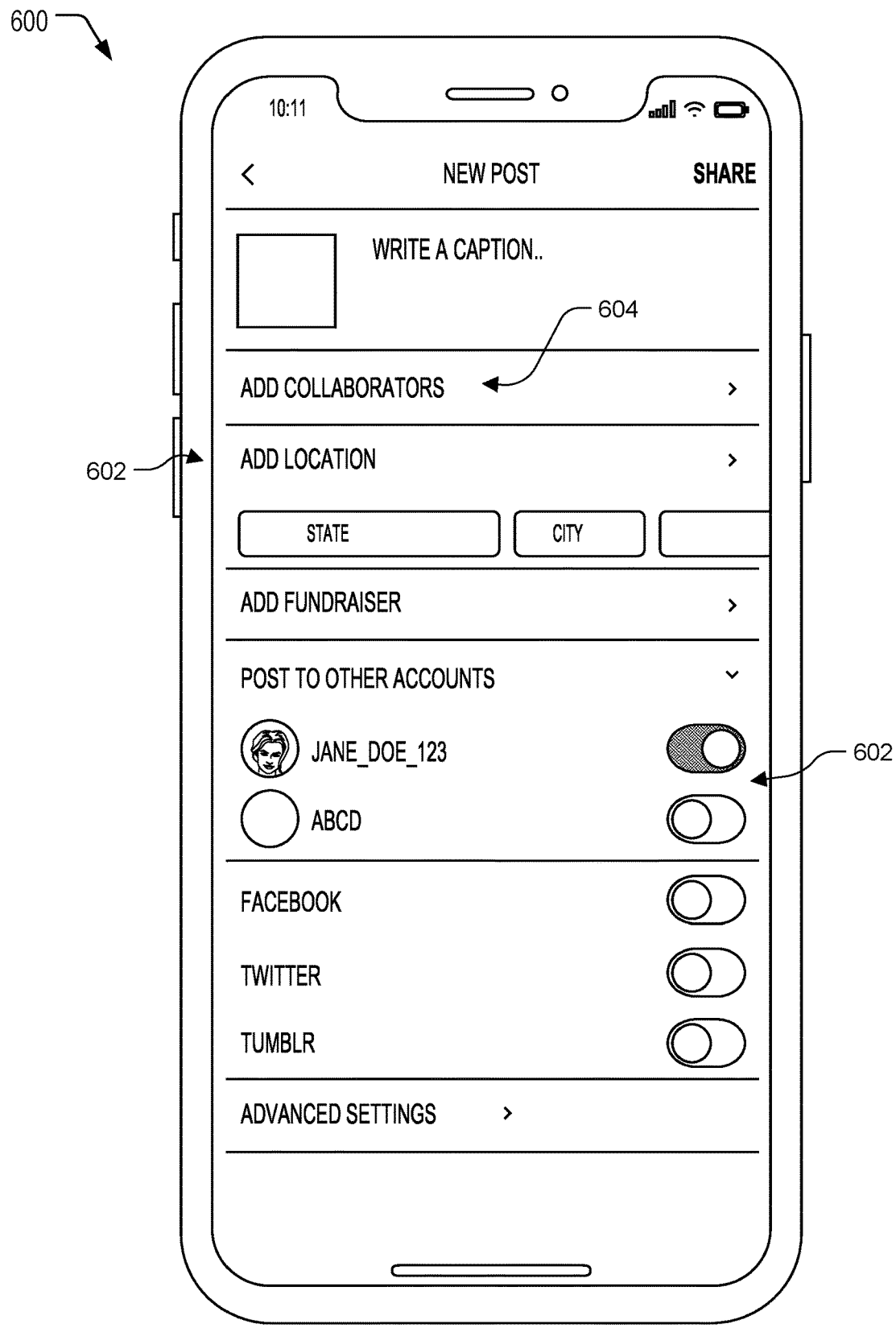
FIG. 6 a view of an example interface for creating collective content associated with a collective account according to some implementations.

FIG. 6 a view of an example interface 600 for creating collective content, such as the content 502 of FIG. 5, associated with a collective account according to some implementations. In this example, a collaborator may create a new content item and select the account to which the content will be posted via the post selection section 602. For example, the user may post the content to either their personal account or to one of the accounts the user is contributing to or collaborating on. In some case, the interface 600 may include a section 604 to select other collaborators as contributing to the content being created. In other example, the additional collaborators or contributors may be added later, such as part of a "tagging" process. FIGS. 7-10 are flow diagrams illustrating example processes associated with the collective accounts as discussed above. The processes are illustrated as a collection of blocks in a logical flow diagram, which represent a sequence of operations, some or all of which can be implemented in hardware, software, or a combination thereof. In the context of software, the blocks represent computer-executable instructions stored on one or more computer-readable media that, which when executed by one or more processors, perform the recited operations. Generally, computer-executable instructions include routines, programs, objects, components, encryption, deciphering, compressing, recording, data structures and the like that perform particular functions or implement particular abstract data types.

The order in which the operations are described should not be construed as a limitation. Any number of the described blocks can be combined in any order and/or in parallel to implement the processes, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

Figure 7:
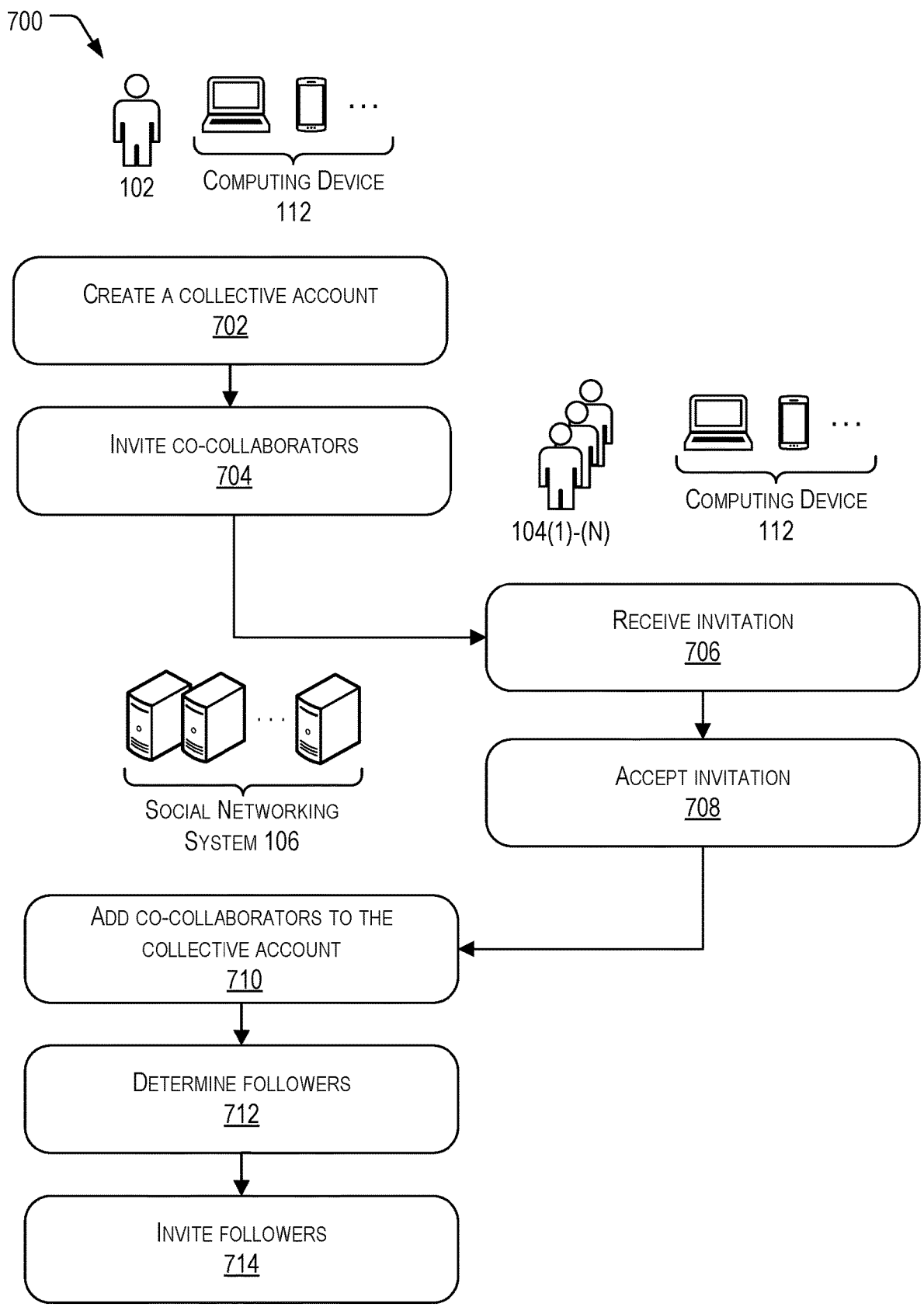
FIG. 7 is a flow diagram illustrating an example process for initiating creation of a collective account via the social networking system according to some implementations.

FIG. 7 is a flow diagram illustrating an example process 700 for initiating and creating a collective account via the social networking system, such as the social networking system 106 of FIG. 1, according to some implementations. As discussed above, an original user, such as the user 102 of FIG. 1, may create a collective account and invite other users, such as the users 104 of FIG. 1, to participate as co-collaborators.

At 702, a user 102 may create a collective account. For example, the user 102 may create an account in a manner of an individual user creating a personal account but select a collective account option allowing multiple users to be account holders, contributors, and otherwise managers of the newly created collective account. For instance, the user 102 may specify identity account content (e.g., account name, address, and the like), background content (e.g., account story, purpose, goals, and the like), demographic or contact content (e.g., personal information of the user 102), initial content (e.g., original posts and the like), and the like.

At 704, the user 102 may invite or otherwise select other users, such as users 104, to become co-collaborators with respect to the account and, at 706, the users 104 may receive the invitations. For example, the user 102 may select the users 104 by typing or entering the user's name, selecting the user 104 from a list or other tagged content, and the like. In this implementation, it should be understood that the invitation of the user 104 as co-collaborators may be incorporated into the collective account creation process.

At 708, the users 104 may accept the invitations. For example, the invitation may be in the form of a notification or alert as including a selectable option to accept. If the users 104 accept, the process 700 proceeds to 710, otherwise the invitation may either remaining open, be closed by the user 102, closed by the user 104, expire after a period of time elapses, and the like. It should be understood that if one or more of the users 104 do not accept the invitation, they will not be added or otherwise associated with the collective account.

At 710, the social networking system 106 may add the co-collaborators to the collective account in response to receiving the corresponding acceptance. Once added, the co-collaborators may be listed as a collaborator on the home page of the collective account, as discussed above with respect to FIG. 4 and/or listed as a contributor to content associated with the collective account, as discussed above with respect to FIG. 5.

At 712, the social networking system 106 may determine followers of the user 104 that accepted the invitation to invite to follow the collective account and, at 714, the social networking system may send the invite to the followers. For example, the social networking system 106 may compare the list of followers of the user 104 with a current list of followers of the collective account and filter the current followers from the followers of the user 104 prior to sending the follower invitations. In this manner, the followers of the user 104 do not receive duplicative invites to follow an account they are already following. In some examples, the social networking system may also filter the followers of the user 104 that accepted the invitation based on followers of other collaborators, such as the founding user 102. In this manner, the followers of the user 102 that did not accept the invitation to follower the collective account do not receive additional notifications or invitations subsequent to the user 104 accepting the invitation.

Figure 8:
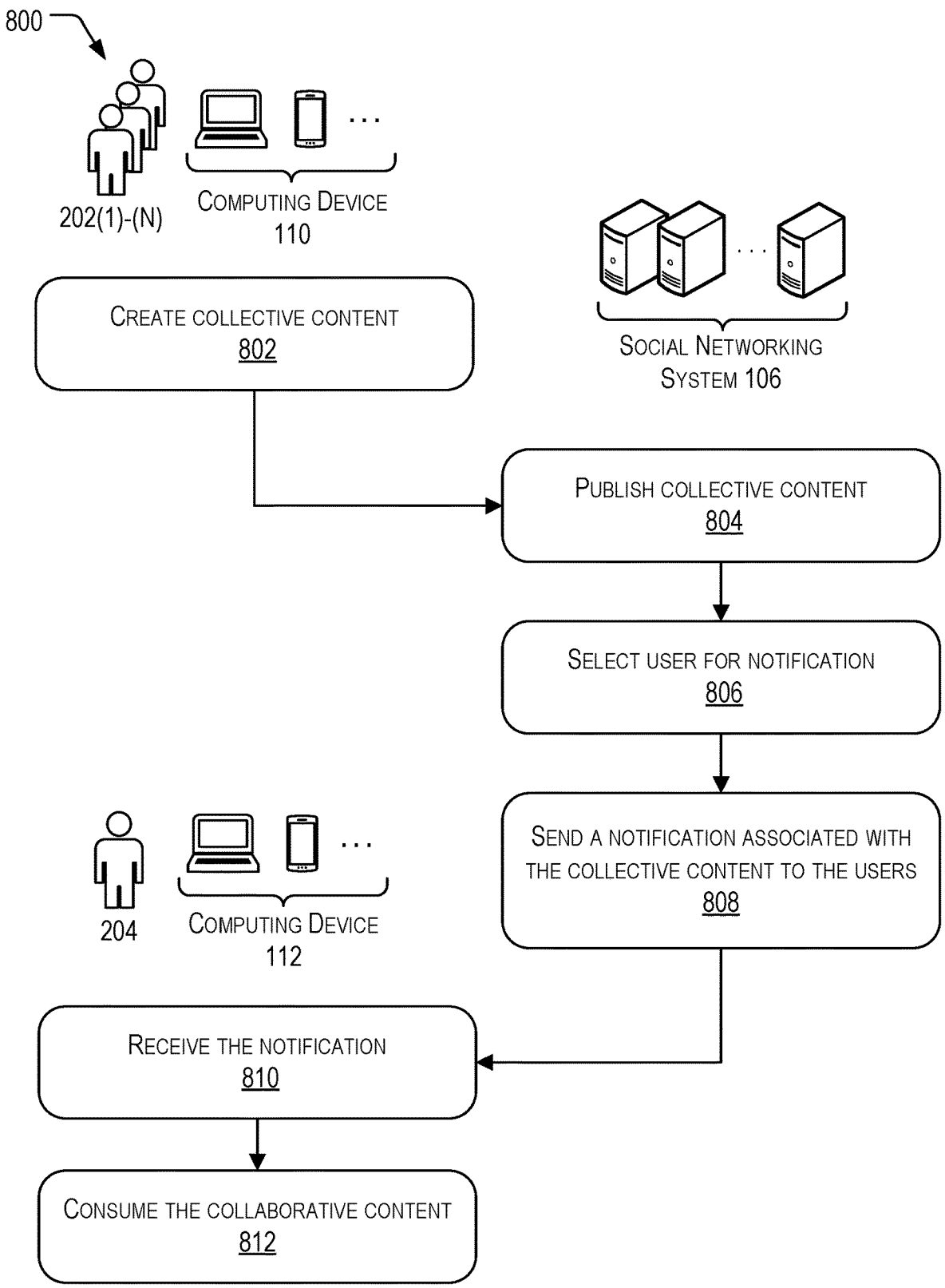
FIG. 8 is a flow diagram illustrating an example process for creating collective content for a collective account via the social networking system according to some implementations.

FIG. 8 is a flow diagram illustrating an example process 800 for creating collective content for a collective account via the social networking system according to some implementations. In some cases, collaborators of a collective account may create, add, edit, remove and otherwise modify content associated with the collective account, such as the users 202 of FIG. 2. Likewise, users of the social networking system, such as users 204 of FIG. 2, may consume the collective content associated with the collective account.

At 802, the users 202 may create collective content for the collective account. The collective content may be associated with, posted to, and/or hosted by the collective account. In some case, the collective content may be generated in a manner of an individual user creating personal content but allow for multiple editors (e.g., the users 202) and/or attribution to multiple users (e.g., a subset of the users 202). In various examples, contributors, as discussed above with respect to FIGS. 5 and 6, may be assigned to the collective content and their personal account information may be displayed in conjunction with the collective content.

At 804, the social networking system may publish the collective content to the collective account. For instance, the content may be stored at a location associated with the collective account and displayed on a home page or other feed associated with the collective account.

At 806, the social networking system may select users, such as the users 204, to receive a notification associated with the collective content and, at 808, the social networking system may send a notification associated with the collective content to the selected users. The notification may include access to the content, details associated with the collective content, details associated with the collective account and/or the contributing collaborators, and the like. In some examples, the users 204 selected to receive the notification may be determined based on a status of the users 204, such as followers of the collective account, followers of a contributor to the collective content, and/or followers of other co-collaborators of the account. In some examples, the users 204 may include a union of the followers of the users 202 and followers of the collective account, such that no users receive the notification related to the newly created content more than once.

At 810, the users 204 may receive the notification and, at 812, the users may consume (e.g., access) the collective content. In some cases, the notification may be a summary or highlight of the content, such as one or more selected images or short video associated with the content, short text based description, or other insight into the subject or topic of the content. In some cases, the content of the notification may be selected by the users 202 when creating the collective content, such as a selected featured image or portion of a video. In some cases, the notification may include a link to access or otherwise consume the content via the social networking system 106.

Figure 9:
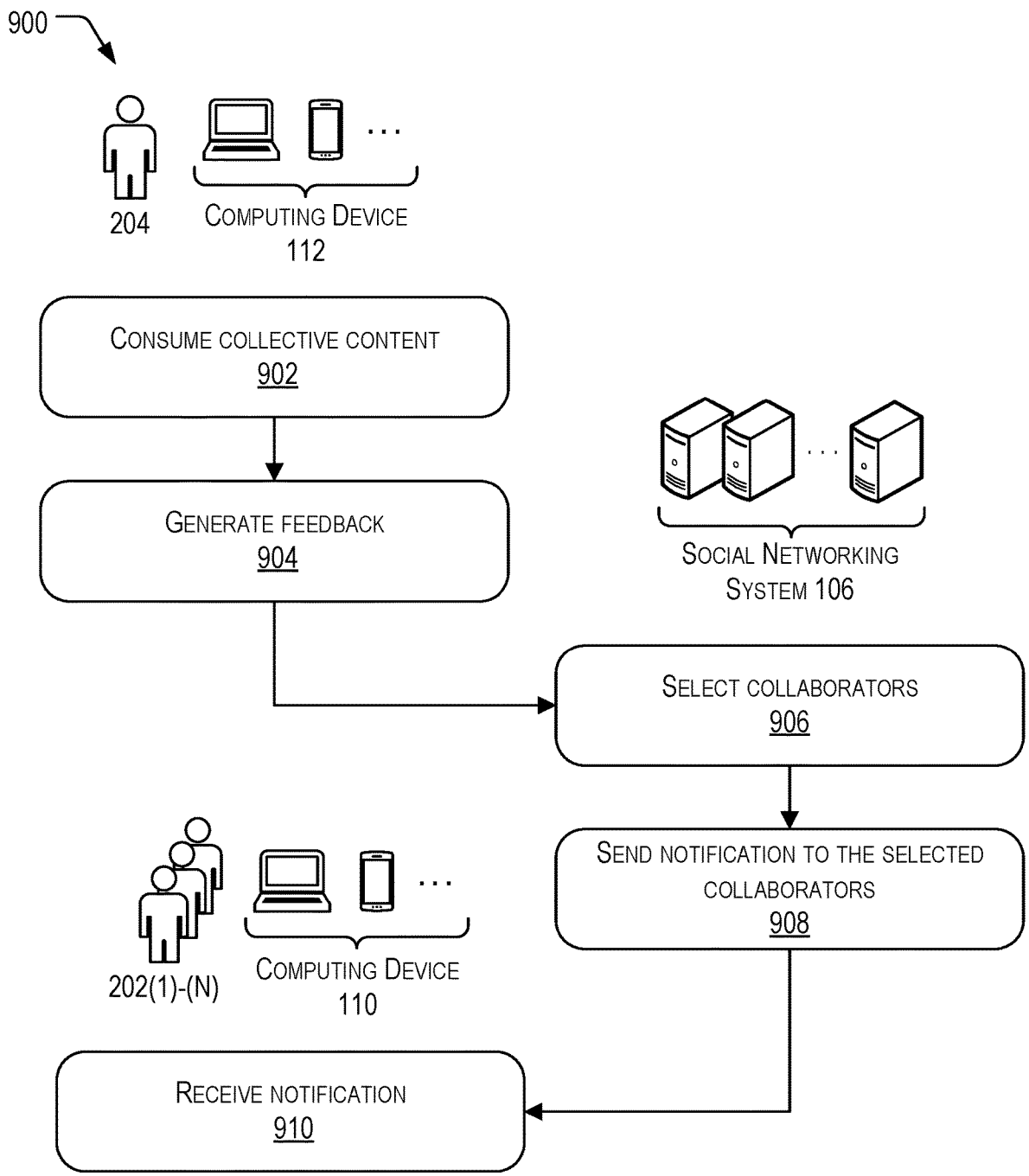
FIG. 9 is a flow diagram illustrating an example process associated with feedback to content associated with a collective account according to some implementations.

FIG. 9 is a flow diagram illustrating an example process 900 associated with feedback to content associated with a collective account according to some implementations. As discussed above with respect to FIG. 8, users, such as users 204 of FIGS. 2 and 3, may be notified regarding and consume collective content posted to/by a collective account.

At 902, the users 204 may consume the collective content. For example, the users 204 may consume the content by viewing the content via the notification discussed above in FIG. 8 and/or by viewing the collective account's home page.

At 904, the users 204 may generate feedback associated with the collective content posted to the collective account. For example, the feedback may include comments, likes, dislikes, shares, as well as other feedback related to the collective content posted to the collective account.

At 906, the social networking system may select collaborators associated with the collective account to receive the feedback and/or a notification associated with the feedback. For example, the social networking system may select the collaborators based at least in part on content of the feedback, the type of feedback, the users that contributed to the collective content, and the like.

At 908, the social networking system may send a notification to the selected collaborators and, at 910, the collaborators may receive the notification. The collaborators may then respond in various manners to the feedback.

Figure 10:
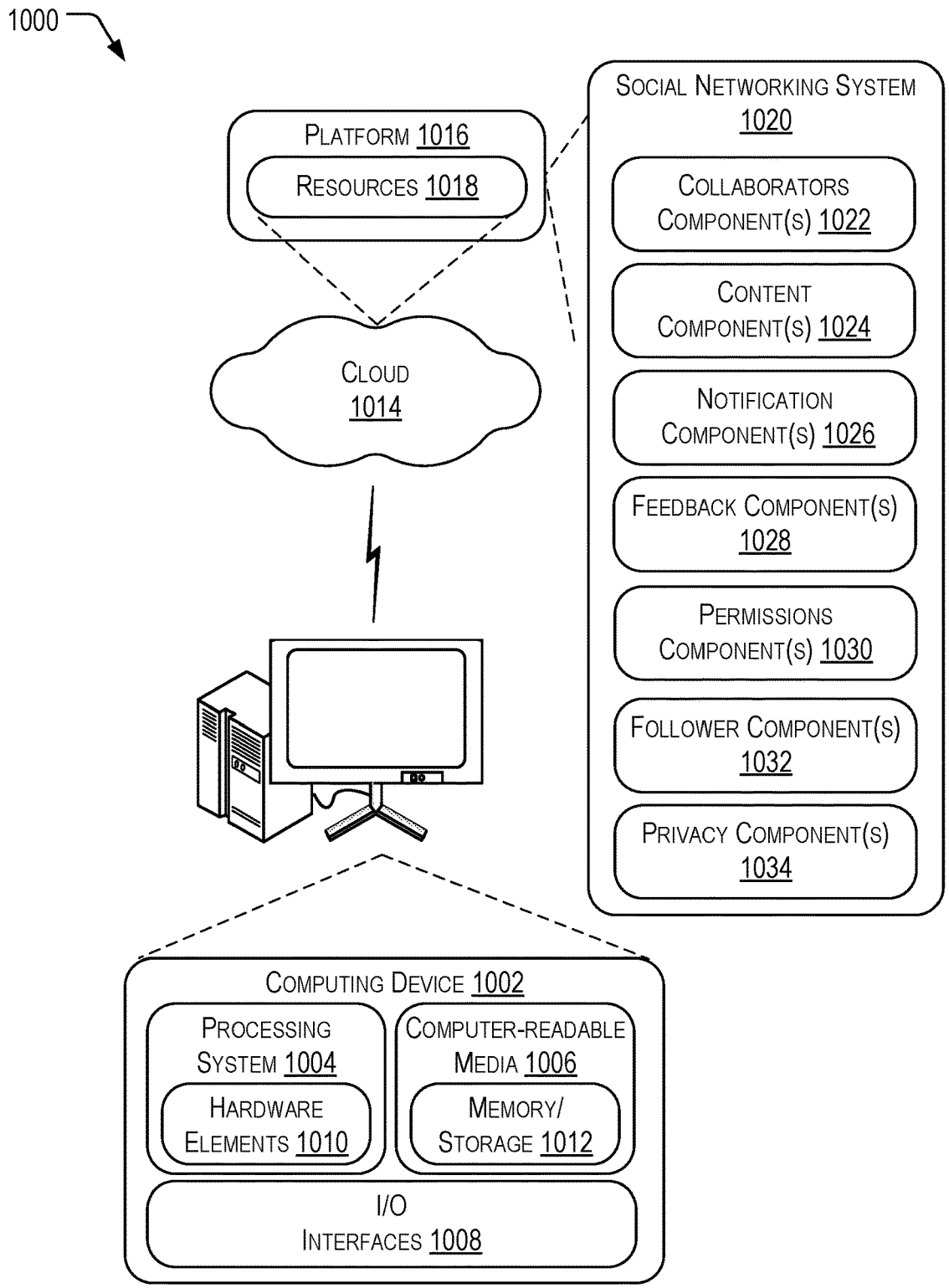
FIG. 10 is an example system and device that is usable to implement the techniques described herein according to some implementations.

FIG. 10 illustrates an example system generally at 1000 that includes an example computing device 1002 that is representative of one or more computing systems and/or devices that may implement the various techniques described herein. This is illustrated through inclusion of a social networking system 1020 comprising a collaborators component 1022, a content component 1024, a notification component 1026, a feedback component 1028, a permission component 1030, a follower component 1032, and a privacy component 1034.

The collaborators component 1022 may be configured to assist a founding user with respect to adding or inviting other users to become co-collaborators with respect to the collective account.

The content component 1024 may be configured to assist with generating content and attributing credit between the collaborators with respect to the newly created content.

The notification component 1026 may be configured to provide notification related to newly added content and/or feedback to, respectively, the users of the social networking system 1020 and the collaborators of the account.

The feedback component 1028 may be configured to assist with identifying one or more users to receive the feedback related to the collective content. For example, the feedback component 1028 may select one or more of the collaborators to receive and respond to the feedback on any particular content item to, for instance, avoid duplicative responses and follow up with respect to the feedback.

The permission component 1030 may be configured to allow a founder user, such as a user 102 of FIG. 1, or other designated collaborator to control permissions with respect to the collective account and the other co-collaborators.

The follower component 1032 may be configured to assist with selecting followers of collaborators to invite to follow the collective account. The follower component 1032 may also be configured to select individual users to receive notifications of collective content posted with respect to the collective account.

The privacy component 1034 may be configured to allow the collective account to act as a public account and/or a private account. In the public account the account may act as a stand alone account viewable by the users of the social networking system 1020 in the manner of accounts held by a single users while allowing and attributing content to multiple holders, editors, contributors, and the like. When the account engages the private setting, the content of the collective account may be accessible only by the contributors and, thereby, provide a closed space with respect to the social networking system 1020 for the collaborators to develop content, share data, otherwise communicate with each other, and the like.

The computing device 1002 may be, for example, a server of a service provider, a device associated with a client (e.g., a client device), an on-chip system, and/or any other suitable computing device or computing system. The example computing device 1002 as illustrated includes a processing system 1004, one or more computer-readable media 1006, and one or more I/O interfaces 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware elements 1010 that may be configured as processors, functional blocks, and so forth. This may include implementation in hardware as an application specific integrated circuit or other logic device formed using one or more semiconductors. The hardware elements 1010 are not limited by the materials from which they are formed, or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1006 is illustrated as including memory/storage 1012. The memory/storage 1012 represents memory/storage capacity associated with one or more computer-readable media. The memory/storage 1012 may include volatile media (such as random access memory (RAM)) and/or nonvolatile media (such as read only memory (ROM), Flash memory, optical disks, magnetic disks, and so forth). The memory/storage 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," "logic," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on and/or transmitted across some form of computer-readable media. The computer-readable media may include a variety of media that may be accessed by the computing device 1002. By way of example, and not limitation, computer-readable media may include "computer-readable storage media" and "computer-readable transmission media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer-readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable transmission media" may refer to a medium that is configured to transmit instructions to the hardware of the computing device 1002, such as via a network. Computer-readable transmission media typically may transmit computer-readable instructions, data structures, program modules, or other data in a modulated data signal, such as carrier waves, data signals, or other transport mechanism. Computer-readable transmission media also includes any information delivery media. The term "modulated data signal" means a signal that has one or more of its characteristics set or changed in such a manner as to encode information in the signal. By way of example, and not limitation, computer-readable transmission media include wired media such as a wired network or direct-wired connection, and wireless media such as acoustic, radio frequency (RF), infrared, and other wireless media.

As previously described, hardware elements 1010 and computer-readable media 1406 are representative of modules, programmable device logic and/or device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation 406 of a module that is executable by the computing device 1002 as software may be achieved at least partially in hardware, e.g., through use of computer-readable storage media and/or hardware elements 1010 of the processing system 1004. The instructions and/or functions may be executable/operable by one or more articles of manufacture (for example, one or more computing devices 1002 and/or processing systems 1004) to implement techniques, modules, and examples described herein.

The techniques described herein may be supported by various configurations of the computing device 1002 and are not limited to the specific examples of the techniques described herein. This functionality may also be implemented all or in part through use of a distributed system, such as over a computing environment or "cloud" 1014 via a platform 1016 as described below.

The cloud 1014 includes and/or is representative of a platform 1016 for resources 1018. The platform 1016 abstracts underlying functionality of hardware (e.g., servers) and software resources of the cloud 1014. The resources 1018 may include applications and/or data that can be utilized while computer processing is executed on servers that are remote from the computing device 1002. Resources 1018 can also include services provided over the Internet and/or through a subscriber network, such as a cellular or Wi-Fi network.

The platform 1016 may abstract resources and functions to connect the computing device 1002 with other computing devices. The platform 1016 may also be scalable to provide a corresponding level of scale to encountered demand for the resources 1018 that are implemented via the platform 1016. Accordingly, in an interconnected device embodiment, implementation of functionality described herein may be distributed throughout multiple devices of the system 1000. For example, the functionality may be implemented in part on the computing device 1002 as well as via the platform 1016 which may represent a cloud computing environment 1014.

CONCLUSION

Although the discussion above sets forth example implementations of the described techniques, other architectures may be used to implement the described functionality and are intended to be within the scope of this disclosure. Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
receiving, from a first device associated with a first account of a social networking system, a request to create a second account with the social networking system, the request indicating a third account with the social networking system to associate with the second account;
sending, to a second device associated with the third account, an invitation to be associated with the second account;
receiving, from the second device, an acceptance of the invitation;
adding, in response to receiving the acceptance, the third account as a collaborator on the second account;
identifying, in response to receiving the acceptance, a fourth account, the fourth account having previously indicated, via the social networking system, an interest in the third account; and
sending, in response to identifying the fourth account and to a third device, collective content associated with the second account.

2. The method as recited in claim 1, wherein adding the third account as the collaborator on the second account further comprises granting a permission to the third account with respect to the second account, the permission comprising at least one of:
a first permission to post content associated with the second account;
a second permission to edit content associated with the second account; or
a third permission to provide feedback to content associated with the second account.

3. The method as recited in claim 2, further comprising:
determining that the fourth account has not previously indicated, via the social networking system, an interest in the second account;
sending, in response to determining that the fourth account has not previously indicated the interest in the second account and to the third device, an invitation to the fourth account to receive notifications associated with the collective content associated with the second account; and
receiving, from the third device and prior to sending the collective content, an acceptance of the invitation to receive notifications associated with the collective content.

4. The method as recited in claim 1, wherein adding the third account as the collaborator on the second account further comprises causing a first identifier associated with the first account and a second identifier associated with the third account to be presented on a display of a fourth device responsive to the fourth device accessing content associated with the second account.

5. The method as recited in claim 1, further comprising determining that the fourth account has not previously indicated, via the social networking system, an interest in the first account prior to sending the invitation to the fourth account.

6. The method as recited in claim 1, further comprising:
receiving, from the third device, an acceptance of an invitation to receive notifications associated with the second account;
sending, to the third device, content associated with the second account;
receiving, from the third device, feedback associated with the content;
determining a set of account holders associated with the second account to receive a notification associated with the feedback based at least in part on at least one of
a subject of the content,
a status of the content,
a status of the fourth account,
a relationship of the fourth account to the first account,
a relationship of the fourth account to the third account,
a relationship of the first account to the content; or
a relationship of the third account to the content; and
sending, to the set of account holders, the notification associated with the feedback.

7. One or more non-transitory computer-readable media storing instructions that, when executed by one or more processors, cause one or more computing devices to perform operations comprising:
sending, to a first device associated with a first account, an invitation to be associated with a collective account, the collective account associated with a second account;
receiving, from the first device, an acceptance of the invitation;
granting, in response to receiving the acceptance, the first account at least one permission associated with the collective account;
identifying, in response to receiving the acceptance, a third account, the third account having previously indicated an interest in the first account; and
sending, in response to determining that the third account has previously indicated the interest in the first account and to a second device associated with the third account, an invitation to receive notifications associated with content associated with the collective account.

8. The one or more non-transitory computer-readable media as recited in claim 7, wherein:
the operations further comprise determining that the third account has not previously indicated an interest in the collective account or the second account; and
sending the invitation to receive notifications is responsive to determining that the third account has not previously indicated the interest in the collective account or the second account.

9. The one or more non-transitory computer-readable media as recited in claim 7, wherein the operations further comprise:
receiving, from the second device, an acceptance of the invitation to receive the notifications associated with the collective account;
streaming, to the second device, content associated with the collective account;
receiving, from the second device, feedback associated with the content;
identifying the first account based at least in part on a relationship of the third account to the first account as a designated account to receive the feedback; and
sending, to the first device, a notification associated with the feedback.

10. The one or more non-transitory computer-readable media as recited in claim 7, wherein the operations further comprise:
causing a first identifier associated with the first account and a second identifier associated with the third account to be presented on a display of a second device while streaming the content.

11. The one or more non-transitory computer-readable media as recited in claim 7, wherein the operations further comprise:
receiving, from the first device, a new content item associated with the collective account;
determining a first set of accounts based on a relationship status of individual accounts of the first set of accounts with the first account;
determining a second set of accounts based on a relationship status of individual accounts of the second set of accounts with the collective account;
generating a third set of users based at least in part on the first set of users and the second set of users; and
sending a notification to devices associated with individual users of the third set of users, the notification associated with the new content item.

12. The one or more non-transitory computer-readable media as recited in claim 11, wherein generating the third set of accounts further comprise filtering duplicate accounts from the third set of accounts.

13. The one or more non-transitory computer-readable media as recited in claim 7, wherein the permission comprises at least one of:
a post content permission for content associated with the second account;
an edit content permission for the content associated with the second account; or
a feedback permission for the second account.

14. A system comprising:
one or more processors; and
one or more computer-readable media storing instructions that, when executed by the one or more processors, cause the system to perform operations comprising:
sending, to a first device associated with a first account, an invitation to be associated with a collective account, the collective account associated with a second account;
receiving, from the first device, an acceptance of the invitation;
granting, in response to receiving the acceptance, the first account at least one permission associated with the collective account;
identifying, in response to receiving the acceptance, a third account, the third account having previously indicated an interest in the first account; and
sending, in response to determining that the third account has previously indicated the interest in the first account and to a second device associated with the third account, an invitation to receive notifications associated with content associated with the collective account.

15. The system as recited in claim 14, the operations further comprising:
receiving, from the second device, an acceptance of the invitation to receive the notifications associated with the collective account; and
sending notifications, to the second device, responsive to content being posted to the collective account.

16. The system as recited in claim 14, wherein the operations further comprise:
  receiving, from the second device, feedback associated with the content of the collective account;
  identifying the first account based at least in part on a relationship of the third account to the first account as a designated account to receive the feedback; and
  sending, to the first device, a notification associated with the feedback.

17. The system as recited in claim 14, wherein the operations further comprise:
  determining that the third account has not previously indicated an interest in the collective account or the second account; and
  sending the invitation to receive notifications is responsive to determining that the third account has not previously indicated the interest in the collective account or the second account.

18. The system as recited in claim 14, wherein the operations further comprise:
  receiving, from the first device, a new content item associated with the collective account;
  determining a first set of accounts based on a relationship status of individual accounts of the first set of accounts with the first account;
  determining a second set of accounts based on a relationship status of individual accounts of the second set of accounts with the collective account;
  generating a third set of users based at least in part on the first set of users and the second set of users; and
  sending a notification to devices associated with individual users of the third set of users, the notification associated with the new content item.

19. The system as recited in claim 18, wherein generating the third set of accounts further comprises:
  determining a fourth set of accounts based on a relationship status of individual accounts of the fourth set of accounts with the second account; and
  wherein the third set of users is based at least in part on the fourth set of users.

20. The system as recited in claim 14, wherein the permission comprises at least one of:
  a post content permission for content associated with the second account;
  an edit content permission for the content associated with the second account; or
  a feedback permission for the second account.

* * * * *